(12) United States Patent
Huang et al.

(10) Patent No.: US 8,191,786 B2
(45) Date of Patent: Jun. 5, 2012

(54) IMMOVABLE PRICE CHECKER WITH AN ANGLE-ADJUSTABLE SCANNER

(75) Inventors: Shu-Ying Huang, New Taipei (TW); Nico Van Dalen, New Tapei (TW)

(73) Assignee: Champtek Incorporated, New Taipei (TW)

( * ) Notice: Subject to any disclaimer, the term of this patent is extended or adjusted under 35 U.S.C. 154(b) by 0 days.

(21) Appl. No.: 13/046,820

(22) Filed: Mar. 14, 2011

(65) Prior Publication Data
US 2011/0303742 A1 Dec. 15, 2011

(30) Foreign Application Priority Data
Jun. 15, 2010 (TW) ................................ 99211411 U (51) Int. Cl.
*G06K 7/10* (2006.01)
(52) U.S. Cl. .................... 235/462.43; 235/375; 235/378; 235/383; 235/385; 235/435; 235/454; 235/462.45
(58) Field of Classification Search ................ 235/375, 235/378, 383, 385, 435, 439, 454, 462.43, 235/462.45
See application file for complete search history.

(56) References Cited

U.S. PATENT DOCUMENTS

| | | | |
|---|---|---|---|
| 4,672,184 A * | 6/1987 | Fujiwara et al. | 235/462.43 |
| 5,083,637 A * | 1/1992 | Kurimoto et al. | 186/61 |
| 5,250,789 A * | 10/1993 | Johnsen | 705/14.23 |
| 5,478,998 A * | 12/1995 | Charych et al. | 235/462.43 |
| 5,710,416 A | 1/1998 | Belknap et al. | |
| 5,726,434 A | 3/1998 | Seo | |
| 6,062,477 A * | 5/2000 | Wike et al. | 235/462.43 |
| 6,062,478 A | 5/2000 | Izaguirre et al. | |
| 6,179,206 B1 * | 1/2001 | Matsumori | 235/383 |
| 2005/0040238 A1 * | 2/2005 | Byun et al. | 235/462.43 |
| 2009/0250515 A1 * | 10/2009 | Todd et al. | 235/383 |
| 2010/0138304 A1 * | 6/2010 | Boyarsky et al. | 705/14.65 |
| 2011/0220712 A1 * | 9/2011 | Nakaeda | 235/375 |

OTHER PUBLICATIONS

K.L.Zhang et al., "Fabrication, modeling and testing of a thin film Au/Ti microheater", International Journal of Thermal Sciences 46 (2007) 580-588.

* cited by examiner

*Primary Examiner* — Ali Sharifzada
(74) *Attorney, Agent, or Firm* — Chun-Ming Shih; HDLS IPR Services (57) ABSTRACT

An immovable price checker (1) with an angle-adjustable scanner is installed on a wall for scanning barcodes of an article and includes a base (10), a scanner (20), a processor (30), a displayer (40) and a pivoting means (50). The base (10) is fixed to the wall. The scanner (20) is connected to the base (10) for scanning the barcodes of the article. The processor (30) is electrically connected to the scanner (20). The displayer (40) is fixed to the base (10) and electrically connected to the processor (30). The displayer (40) is configured to display data processed by the processor (30). The pivoting means (50) is connected between the base (10) and the scanner (20). The scanner (20) is rotatable with respect to the base (10) by using the pivoting means (50) as a center of rotation to thereby adjust the angle of the scanner (20). Thus, the convenience and practicability of the present invention are improved greatly.

7 Claims, 7 Drawing Sheets

FIG.7 ized for simplicity.">
IMMOVABLE PRICE CHECKER WITH AN ANGLE-ADJUSTABLE SCANNER

BACKGROUND OF THE INVENTION

1. Field of the Invention

The present invention relates to a price checker, in particular to an immovable price checker with an angle-adjustable scanner.

2. Description of Prior Art

With the advancement of science and technology, barcodes are widely used in various articles. The barcodes provided on the article have important information (such as: price) of the article. Thus, in order to scan the barcodes on the article to check its price, various scanners are proposed. The scanner is combined with an external or built-in displayer to form a so-called price checker, whereby the price of the article can be displayed conveniently for customers.

The price checkers are classified into two categories including a movable price checker and an immovable price checker. The movable price checker is one which an operator can hold it by a hand and carry it to approach the article to scan the barcodes on the article. Such a movable price checker is often used on a cash counter in a convenience store. With an external displayer (such as a screen of a cash register) being electrically connected to the movable price checker, the information in the barcodes scanned by the scanner can be displayed on the displayer immediately.

Unlike the movable price checker, the immovable price checker is often fixed to a predetermined position (for example, fixed on a wall with approximately one meter from the ground). The immovable price checker is often used in a large-size supermarket. A customer has to move the desired article to the underside of the immovable price checker and then to rotate the article until the barcodes on the article are accurately scanned by a scanner provided in the immovable price checker. In this way, the information in the barcodes can be displayed on a screen built in the immovable price checker.

However, the customer may sometimes require strenuous effect to move a bulk and heavy article (such as a bag of rice) to the underside of the immovable price checker, and then rotate the article to make the barcodes on the article to be scanned by the scanner. Thus, the customer has to perform the above-mentioned steps in order to check the price of the article, which is so inconvenient and laborious for the customer.

Therefore, in order to solve the above-mentioned problems, the present Inventor proposes a novel and reasonable structure based on his research and experiments.

SUMMARY OF THE INVENTION

The present invention is to provide an immovable price checker with an angle-adjustable scanner. A user can adjust the angle of the scanner to accurately scan the barcodes on an article, thereby increasing the convenience and practicability of the present invention.

The present invention provides an immovable price checker with an angle-adjustable scanner, installed on a wall for scanning barcodes of an article and including:

a base fixed to the wall;

a scanner connected to the base for scanning the barcodes of the article;

a processor electrically connected to the scanner;

a displayer fixed to the base and electrically connected to the processor, the displayer being configured to display data processed by the processor; and a pivoting means connected between the base and the scanner;

wherein the scanner is rotatable with respect to the base by using the pivoting means as a center of rotation to thereby adjust the angle of the scanner.

In comparison with prior art, the present invention has advantageous effects as follows.

Since the scanner is pivotally connected to the base and rotatable with respect to the base by using the pivoting means as a center of rotation, the user can adjust the angle of the scanner with respect to the base, so that the scanner can scan the barcodes on the article easily. Thus, it is unnecessary for the user to laboriously rotate the article to make the barcodes to be scanned by the scanner of a conventional immovable price checker. Therefore, the convenience and practicability of the present invention are improved greatly.

DETAILED DESCRIPTION OF THE INVENTION

The detailed description and technical contents of the present invention will become apparent with the following detailed description accompanied with related drawings. It is noteworthy to point out that the drawings is provided for the illustration purpose only, but not intended for limiting the scope of the present invention.

Please refer to FIGS. 1 to 4. The present invention provides an immovable price checker 1 with an angle-adjustment scanner (referred to as "price checker 1" hereinafter). The price checker 1 is installed on a wall (not shown) for scanning barcodes of an article (not shown). The price checker 1 includes a base 10, a scanner 20, a processor 30, a displayer 40 and a pivoting means 50.

Figure 3:
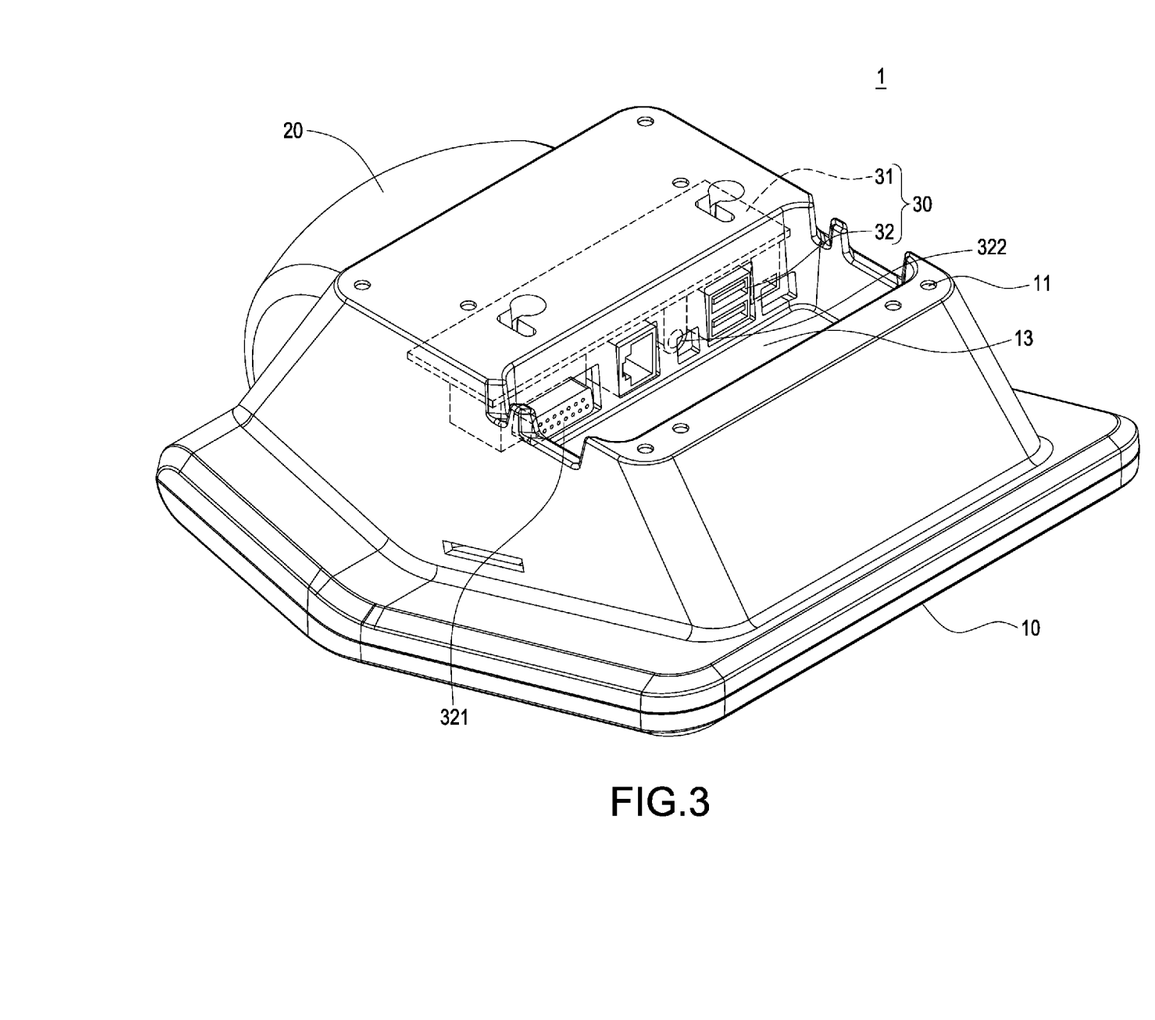
FIG. 3 is a bottom perspective view of the present invention.
Figure 4:
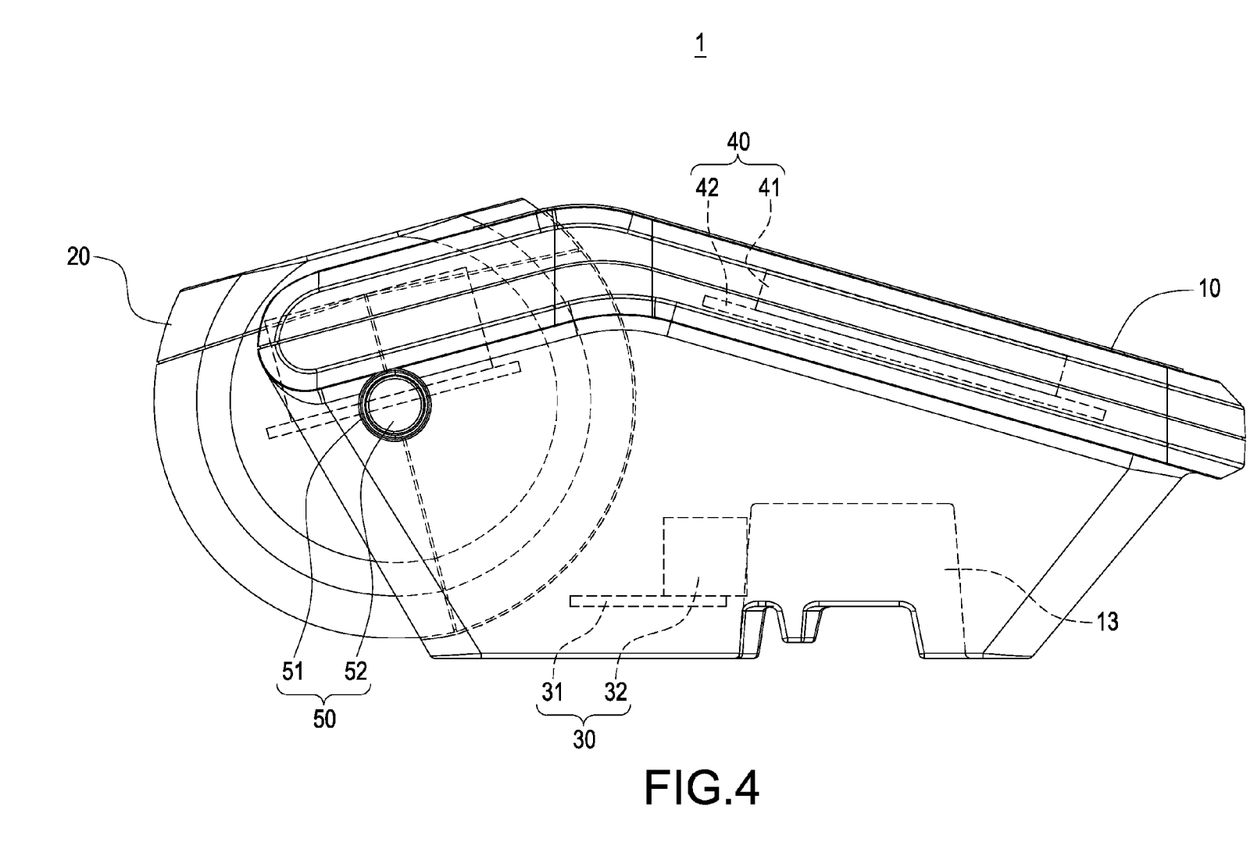
FIG. 4 is a side view of the present invention.

The base 10 is substantially formed into a rectangular shape and fixed on the wall. As shown in FIG. 3, the bottom surface of the base 10 is provided with a plurality of fixing holes 11 for allowing hooks or nails (not shown) protruding from the wall to be inserted into the fixing holes 11. In this way, the price checker 1 can be fixed on the wall. The shape of the base 10 is not limited to the rectangular shape only, and it may be modified according to practical demands.

Figure 1:
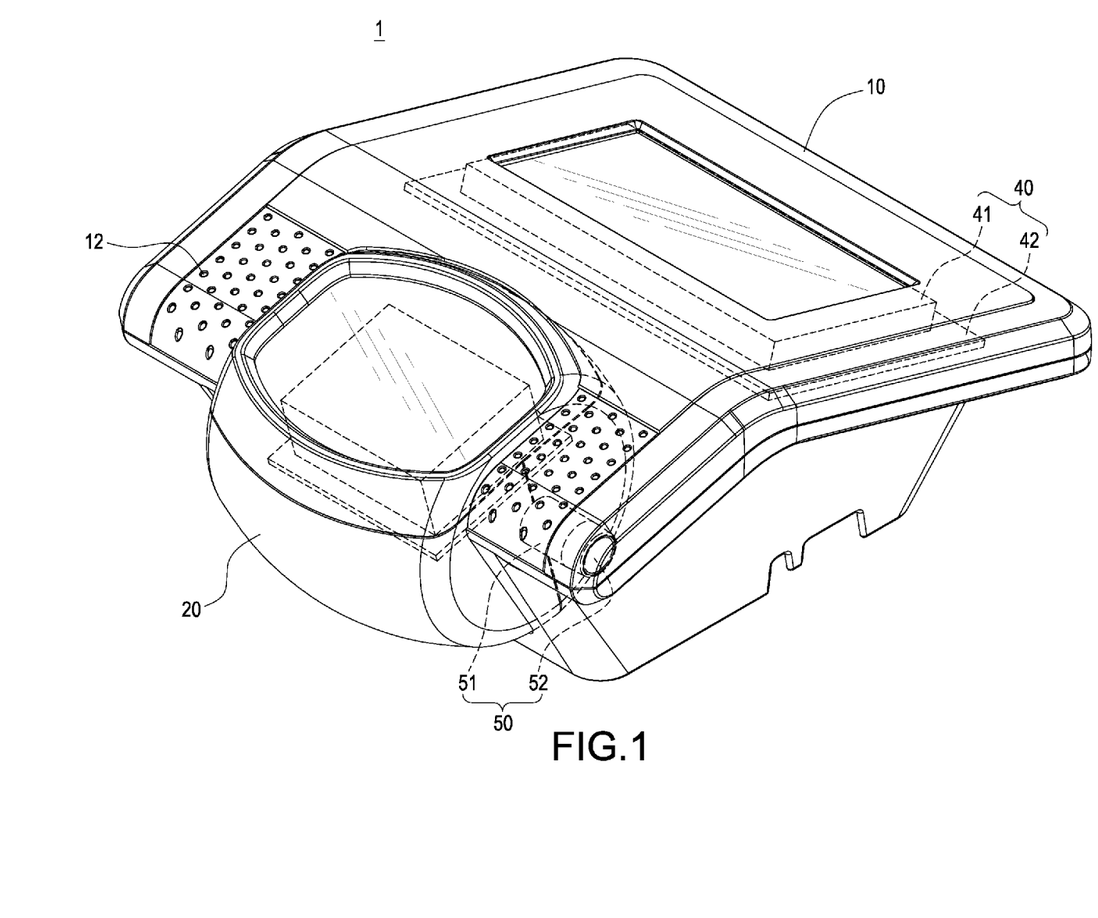
FIG. 1 is a perspective view of the present invention.
Figure 2:
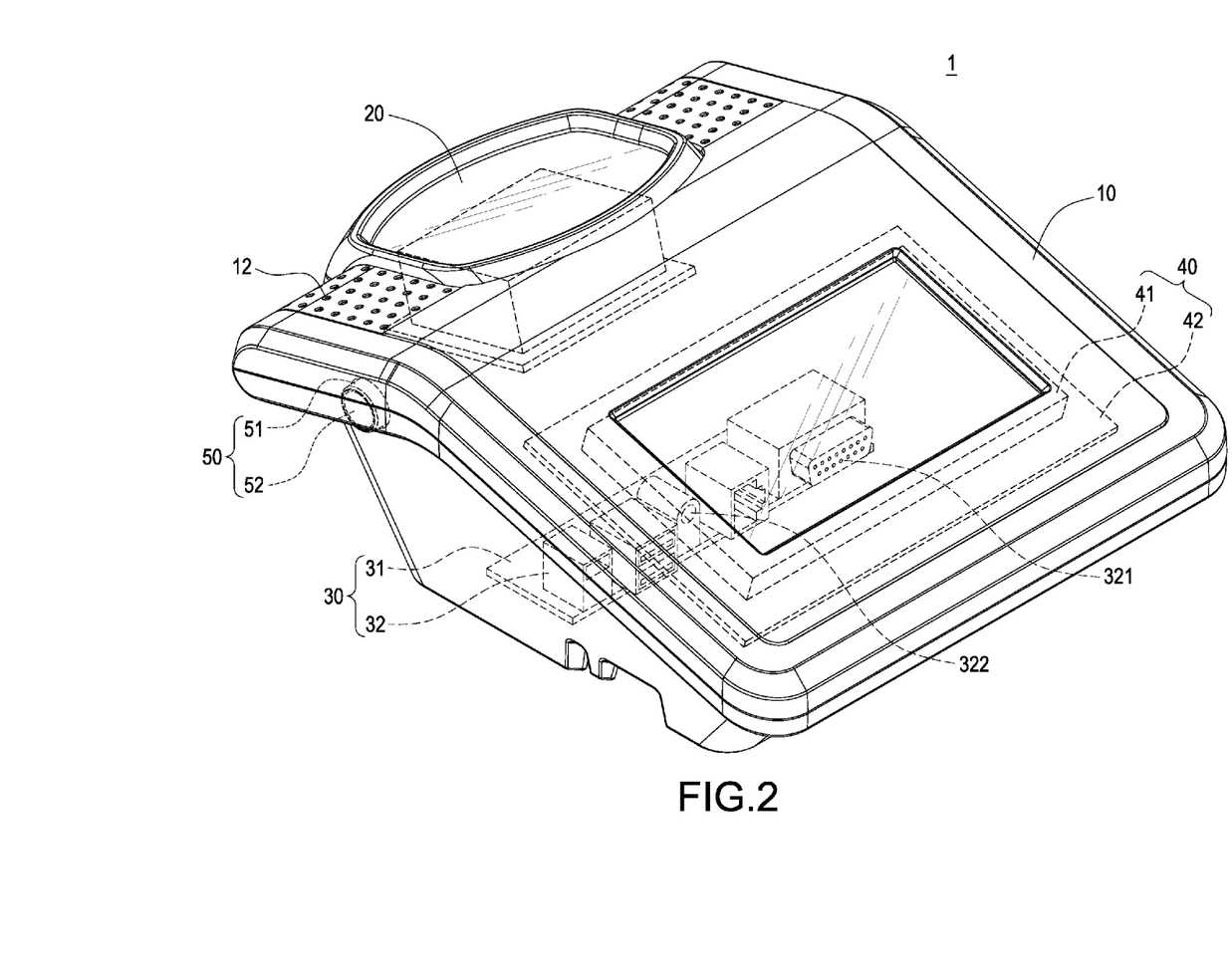
FIG. 2 is another perspective view of the present invention.

In the embodiment shown in FIG. 1, the scanner 20 is connected to a lower portion of the base 10 for scanning the barcodes of the article. The scanner 10 is substantially formed into an oval shape, and the interior of the scanner 30 is provided with a light source (not shown) for emitting light beams for scanning the barcodes. Since the components within the scanner 20 are not the technical characteristics of the present invention, the description relating thereto is omitted for simplicity. It should be noted that, since the light source is provided within the scanner 20 for emitting lights, the light source inevitably generates heat during its operation. In view of this, a portion of the surface of the base 10 adjacent to the scanner 20 is provided with a plurality of heat-dissipating holes 12, thereby dissipating the heat of the scanner 20 to the outside.

The processor 30 is provided in the base 10 and electrically connected to the scanner 20. The scanner 30 comprises a circuit board 31 and an input/output end 32 (FIG. 2, refereed to as "I/O end" hereinafter) provided on the circuit board 31. The interior of the circuit board 31 is provided with electronic circuitry (not shown) for processing the information of barcodes scanned by the scanner 20 and converting the information into the data to be displayed on the displayer 40. The I/O end 32 comprises various connecting ports 321 including USB, RJ-45, VGA or the like and a power input port 322. The connecting port 321 is electrically connected to a data processing system (not shown). The data processing system is configured to store the information of various barcodes and feedback the information of barcodes to the displayer 40. The bottom surface of the base 10 is provided with an accommodating trough 13 (FIG. 3), and the I/O end 32 is mounted in the base 10 with the connecting port 321 being observable in the accommodating trough 13. By this arrangement, it is convenient for the user to insert the connecting line (not shown) into the connecting port 321.

The displayer 40 is fixed to an upper portion of the base 10 and electrically connected to the processor 30 for displaying the data (such as the price of the article) processed by the processor 30. The displayer 40 comprises a screen 41 and a circuit board 42 electrically connected to the screen 41 and the processor 30. The user only needs to look at the data displayed on the screen 41 so as to know the price of the article.

The pivoting means 50 is connected between the base 10 and the scanner 20. In the embodiment shown in FIG. 1, the pivoting means 50 comprises a hole 51 provided in the base 10 and a pivot shaft 52 connected to one side of the scanner 20 to insert into the hole 51. By this arrangement, the scanner 20 is rotatable with respect to the base 10 to adjust the angle of the scanner 20 by using the pivot shaft 52 of the pivoting means 50 as a center of rotation.

Figure 5:
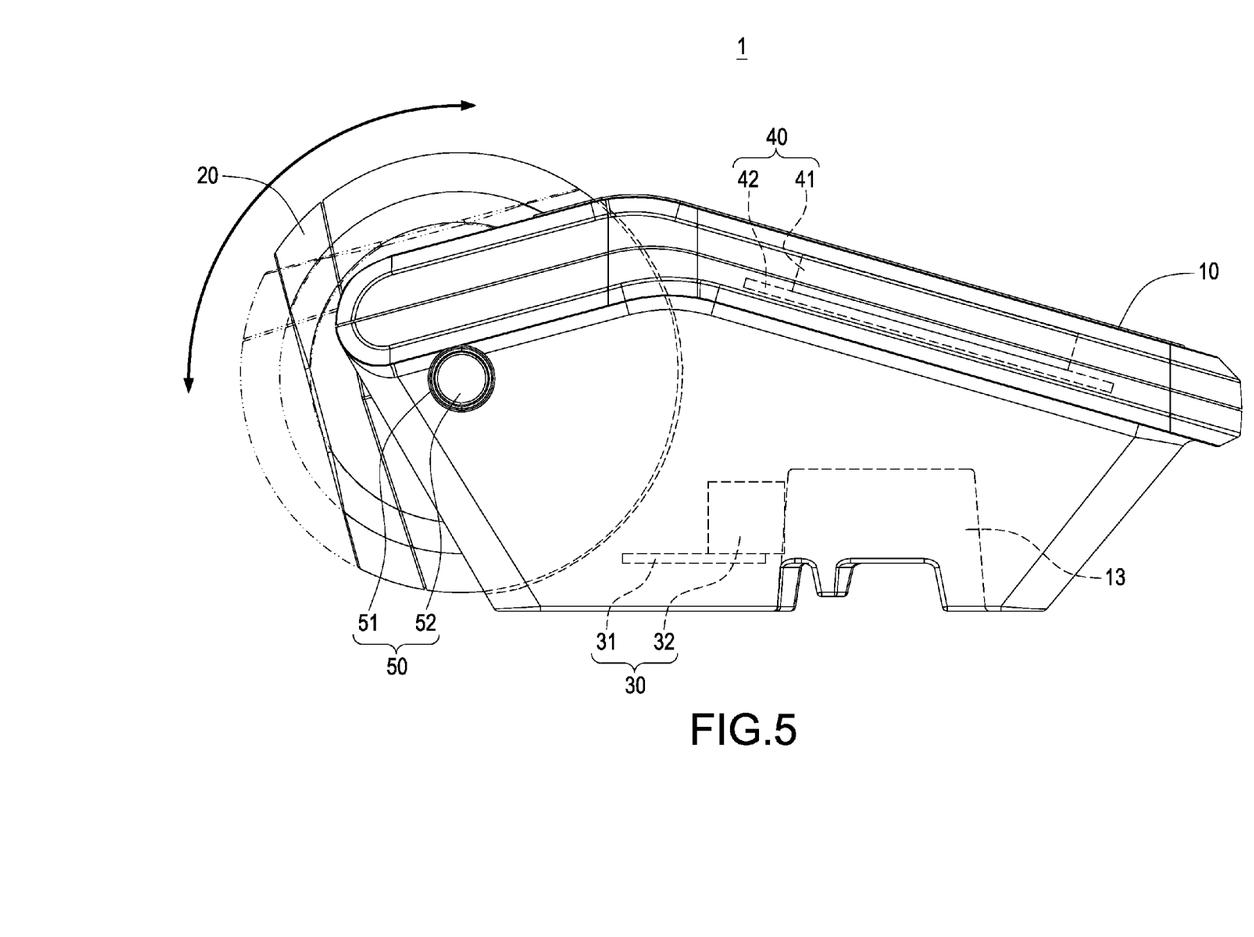
FIG. 5 is a side view of the present invention showing the angle of the scanner.

According to the present invention, the angle of the scanner 20 can be adjusted in a stageless or multiple-stage manner. FIG. 5 shows the angle of the scanner 20 is adjusted in a stageless manner. When the hole 51 and the pivot shaft 52 are in an interference fit, the user can rotate (clockwise or counterclockwise shown in FIG. 5) the scanner 20 with respect to the base 10 around the pivot shaft 52 to a desired angle. The scanner 20 can be fixed to the desired angle by means of the friction force between the hole 51 and the pivot shaft 52. Thus, the scanner 20 is ready to scan the barcodes of the articles.

Figure 6:
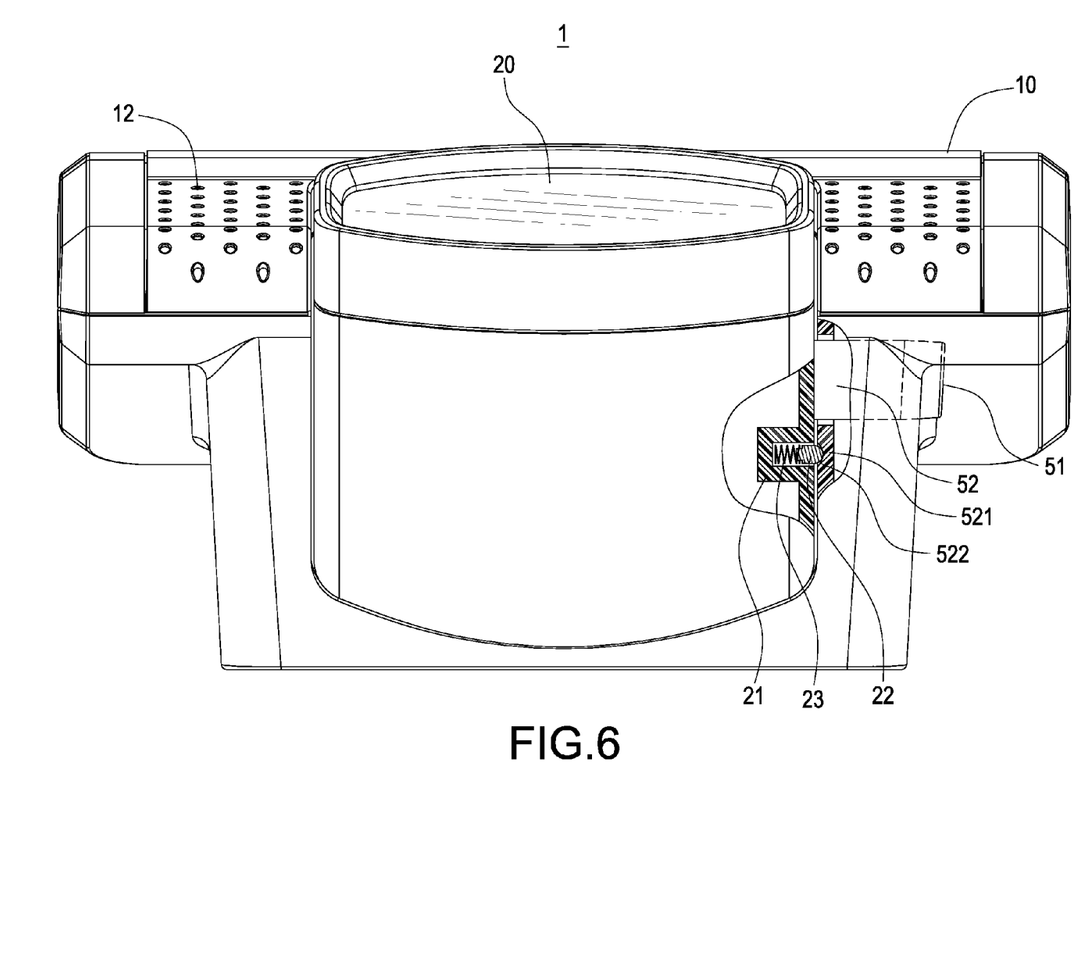
FIG. 6 is a partial cross-sectional view of the present invention showing multiple stages of angle adjustment of the scanner.
Figure 7:
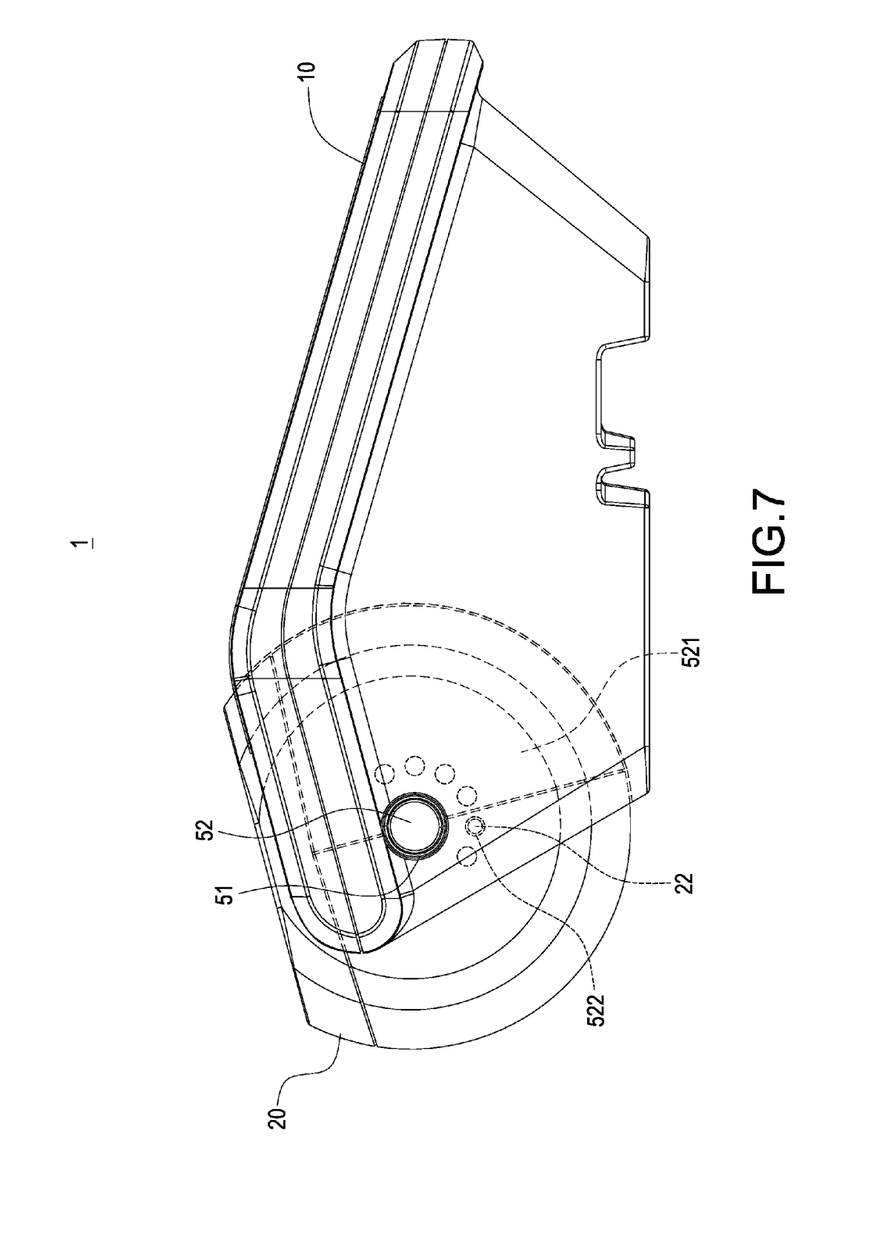
FIG. 7 is a side cross-sectional view of FIG. 6, showing the multiple stages of angle adjustment of the scanner.

Please refer to FIGS. 6 and 7. In the present embodiment, the angle of the scanner 20 is adjusted in a multiple-stage manner. The pivot shaft 52 is not integrally formed with the scanner 20 but formed as a separate component. The periphery of the pivot shaft 52 is formed with a positioning flange 521. The positioning flange 521 is provided with a plurality of positioning holes 522 (seven shown in the FIG. 7). One surface of the scanner 20 adjacent to the positioning flange 521 is provided with a notch 21, in which a positioning post 22 and a spring 23 for abutting the positioning post 22 are provided. The positioning post 22 can be selectively engaged in one of the positioning holes 522. It can be seen from FIG. 6 that the tip of the positioning post 22 is made round to be easily engaged within the positioning hole 522. When the user exerts a force to rotate the scanner 20, the positioning post 22 can be removed from the original positioning hole 522 and engaged in another positioning hole 522, thereby achieving the multiple-stage adjustment of the angle of the scanner 20.

Although the present invention has been described with reference to the above embodiments, the present invention is not limited thereto. The scanner 20 and the displayer 40 may not be necessarily provided in a vertical direction of the base 10. Alternatively, the scanner 20 and the displayer 40 may be provided in a horizontal direction of the base 10 as long as the scanner 20 can rotate with respect to the base 10. The shapes and dimensions of the base 10, the scanner 20 and the displayer 40 can be modified according to practical demands. In the previous embodiments of the present invention, although one side of the scanner 20 is connected to the pivot shaft 52, both sides of the scanner 20 may be provided with a pivot shaft 52 respectively to be connected to the base 10. The above modifications and equivalent changes are still embraced in the scope of the present invention.

In comparison with prior art, the present invention has advantageous effects as follows.

Since the scanner 20 is pivotally connected to the base 10 and rotatable with respect to the base 10 by using the pivoting means 50 as a center of rotation, the user can adjust the angle of the scanner 20 with respect to the base 10, so that the scanner 20 can scan the barcodes on the article easily. Thus, it is unnecessary for the user to laboriously rotate the article to make the barcodes to be scanned by the scanner of a conventional immovable price checker. Therefore, the convenience and practicability of the present invention are improved greatly.

What is claimed is:

1. An immovable price checker with an angle-adjustable scanner, installed on a wall for scanning barcodes of an article and including:
   a base (10) fixed to the wall;
   a scanner (20) connected to the base (10) for scanning the barcodes of the article;
   a processor (30) mounted in the base (10) and electrically connected to the scanner (20);
   a displayer (40) fixed to the base (10) and electrically connected to the processor (30), the displayer (40) having a screen (41) above the scanner (20), the screen (41) forming an included angle with respect to the wall, the screen (41) being immovable and kept in a visible angle to display data processed by the processor (30); and
   a pivoting means (50) connected between the base (10) and the scanner (20), the pivoting means (50) comprises a hole (51) provided in the base (10) and a pivot shaft (52) connected to one side surface of the scanner (20) to insert into the hole (51);
   wherein the scanner (20) is rotatable with respect to the base (30) by means of the rotation of the pivot shaft (52) of the pivoting means (50) relative to the hole (51) to thereby adjust the angle of the scanner (20),
   wherein a periphery of the pivot shaft (52) is formed with a positioning flange (521), the positioning flange (521) is provided with a plurality of positioning holes (522), one surface of the scanner (20) adjacent to the positioning flange (521) is provided with a notch (21), the notch is provided therein with a positioning post (22) and a spring (23) for abutting the positioning post (22), and the positioning post (22) is selectively engaged in each of the positioning holes (522).

2. The immovable price checker with an angle-adjustable scanner according to claim 1, wherein a bottom surface of the base (10) is provided with a plurality of fixing holes (11) for fixation to the wall, and a portion of a surface of the base (10)

adjacent to the scanner (20) is provided with a plurality of heat-dissipating holes (12).

3. The immovable price checker with an angle-adjustable scanner according to claim 2, wherein the processor (30) comprises a circuit board (31) and an I/O end (32) provided on the circuit board (31).

4. The immovable price checker with an angle-adjustable scanner according to claim 3, wherein the I/O end (32) comprises at least one connecting port (321) and a power input port (322), and the connecting port (322) is selected from any one of the group constituted of USB, RJ-45 and VGA.

5. The immovable price checker with an angle-adjustable scanner according to claim 4, wherein the displayer (40) further comprises a circuit board (42) electrically connected to the screen (41).

6. The immovable price checker with an angle-adjustable scanner according to claim 5, wherein a bottom surface of the base (10) has an accommodating trough (13), and the I/O end (32) is mounted in the base (10) with the connecting port (321) being observable in the accommodating trough (13).

7. The immovable price checker with an angle-adjustable scanner according to claim 1, wherein the hole (51) and the pivot shaft (52) are in an interference fit.

\* \* \* \* \*